United States Patent [19]

Trösch et al.

[11] Patent Number: 5,252,810
[45] Date of Patent: Oct. 12, 1993

[54] PART MOLDED FROM THERMOPLASTIC MATERIAL

[75] Inventors: Paul Trösch; Erasmo Porfido, both of Schaffhausen; Kurt Schnetzler, Neunkirch, all of Switzerland

[73] Assignee: Georg Fischer Rohrleitungssysteme AG, Schaffhausen, Switzerland

[21] Appl. No.: 918,335

[22] Filed: Jul. 21, 1992

[30] Foreign Application Priority Data

Jul. 22, 1991 [CH] Switzerland .................. 02189/91

[51] Int. Cl.⁵ .................. B29C 65/00; F16L 47/02
[52] U.S. Cl. .................. 219/544; 219/535; 285/21; 285/286; 285/410
[58] Field of Search .................. 219/544, 524, 535, 541; 285/331, 21, 286, 907, 909, 367, 366, 410, 423; 264/27; 156/274.2, 379.7, 158, 379.6, 273.9

[56] References Cited

U.S. PATENT DOCUMENTS

| | | | |
|---|---|---|---|
| 4,299,413 | 11/1981 | Neher | 285/423 |
| 4,508,368 | 4/1985 | Blumenkranz | 285/21 |
| 4,530,524 | 7/1985 | Stephens | 285/252 |
| 4,958,857 | 9/1990 | Sixsmith | 285/21 |

Primary Examiner—Bruce A. Reynolds
Assistant Examiner—Michael D. Switzer
Attorney, Agent, or Firm—Anderson Kill Olick & Oshinsky

[57] ABSTRACT

A part molded from thermoplastic material is disclosed comprising welding bush portions each of which are provided with a heating coil for connection with tubularly-shaped parts. A clamping portion with slots and screws arranged in flanges facilitates the clamping of wherein the welding bush portion by the screws against the inserted tubularly-shaped part, assuring fixation and retention of the parts prior to and during the welding process.

9 Claims, 1 Drawing Sheet

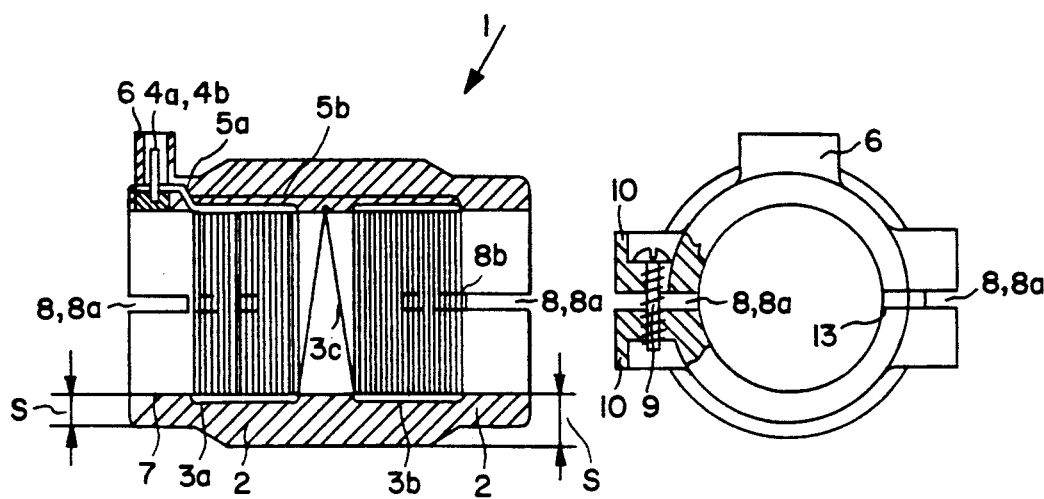
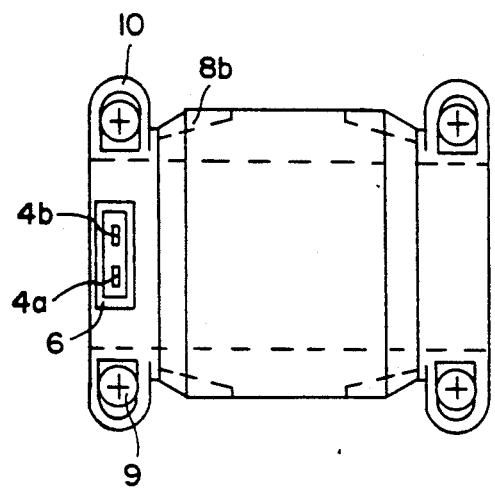
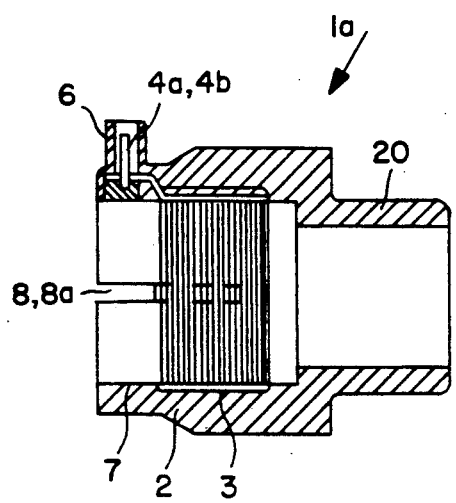

PART MOLDED FROM THERMOPLASTIC MATERIAL

FIELD OF THE INVENTION

The present invention is directed to a part molded from thermoplastic material, and more particularly to a clamping device for fixation and clamping of an inserted tube prior to the welding operation.

BACKGROUND OF THE INVENTION

EP-A1-0253966 describes a mold part clamping element for the fixing of a tube inserted into it in an axial direction and for eliminating the radial clearance prior to making the welded connection. The clamping element is either a tightening nut with a conical squeezing portion or a clamping strip or band at the external periphery of a bushing portion. Wire ends of a heating device comprising two heating mats are arranged in a parallel circuit and are made to exit on the ends of the molded part. Such structure however virtually prevents the arrangement of a fixed plug-in connection at the external periphery of the bushing for a rapid connection with a welding aggregate. Indeed, such connection is possible only by lengthening the molded member because of the space requirement for the clamping element.

Such structure also increases the fabrication expense of the molded part because of the type of the clamping element and the design of the heating device.

It is therefore an object of the present invention to provide a molded part which facilitates fixation in place of the inset tube with a simple means prior to the welding operation.

Another object of the invention is to provide a molded part wherein the arrangement of a plug-in connection for connection of the heating device to the welding aggregate is made possible without great expense because of the design of the plug-in connection.

Yet another object of the invention is to enable a simple design of the clamping device for fixation and clamping or squeezing of the inserted tube prior to the welding operation using only commercially available screws.

A further object of the invention is to make possible the arrangement of a plug-in device at the bushing end for connecting the heating coil to a welding aggregate.

SUMMARY OF THE INVENTION

These and other objects of the invention, which will become apparent hereafter, are achieved by the present part molded from thermoplastic material with at least one welding bush portion having an electrical heating coil for connecting the molded part with a tubularly shaped part. An insertion end of the welding bush portion of the apparatus has at least one incision and a clamping device for radial pre-clamping of the bush portion. At least one screw for clamping the parts together is disposed in the region of the incision in the molded-on flanges at the outer circumference of the bush portion.

BRIEF DESCRIPTION OF THE DRAWINGS

The invention will be better understood by the Detailed Description of the Preferred Embodiment in conjunction with the drawings of which:

FIG. 1 depicts a molded part configured as a bush or sleeve;

FIG. 2 is a side view of the apparatus of FIG. 1. partially in section;

FIG. 3 is a plan view of the apparatus of FIG. 1; and

FIG. 4 depicts another embodiment of the molded part in FIG. 1 in the longitudinal section.

DETAILED DESCRIPTION OF THE PREFERRED AND ALTERNATE EMBODIMENTS

Reviewing now the drawings, wherein like numerals depict like elements throughout the several views, FIG. 1 to 3 show a molded part 1 configured as a bushing from thermoplastic material for connecting two tubes by welding using an electrical heating device.

The molded part 1 comprises a welding bush portion 2 for each tube to be connected and a heating device 3 wound in a spiral shape at the internal circumference of said bush. Two heating coils 3a and 3b are axially spaced from each other but are connected to each other by a winding 3c having a greater pitch than the coils. The heating device can also comprise a continuous heating coil. The heating coil 3 consists of a resistance wire which can also be provided with a heat-resistant insulation layer. The resistor wire can be sheathed in a thermoplastic material corresponding, to the extent possible, to that of the molded part.

The front end of the heating coil 3a is connected by a conductive connector 5a with a contact plug 4a at an end of the bushing. The rear end of the heating coil 3b is connected by a conductive connector 5b with a contact plug 4b, wherein the two contact plugs 4a, 4b can be arranged circumferentially next to each other to be protected by a wall 6 surrounding the molded part 1. The conductive connector 5b extends longitudinally along the molded part 1 crossing over the heating coils 3a, 3b, preferably with a spacing from these within the molded part.

A clamping portion 7, which can be designed to be cylindrical or also cone-shaped, is positioned between the bushing end and the beginning of the heating coils 3a, 3b and can be radially clamped against the inserted tube by incisions 8 and screws 9.

In this embodiment, the incisions 8 are configured as slots 8a continuous up to the internal circumference, wherein two slots 8a are arranged to lie radially opposite each other. The slots 8a run in a plane which extends perpendicularly to the clamping direction. The screws 9 are disposed perpendicularly to the radial slots 8a. Flanges 10 are molded at the outer circumference on both sides of each slot 8a, wherein the screw 9 passing through a continuous hole 11 in one flange 10, is threaded into the other flange 10. A simple clamping of the squeezing portion 7 is produced by means of the screws 9. Self-tapping screws 9 are used, which, when screwed into a borehole in the flanges 10, cut a thread at the same time. Through-bolts with a nut can also be utilized.

Because the slots 8a and the flanges 10 at the molded part 1 lie opposite each other at approximately 180°, sufficient space exists in between at its outer circumference for the arrangement of a plug-in connection 4a, 4b. The radially continuous slots 8a end in an axial direction with a spacing from the beginning of the heating coil 3a, 3b so that a good pressure buildup of the melt required for a good welded connection is achieved in the course of the welding process. Thin deformable wall 13 at the internal circumference at the slot 8a enables a pressure buildup of the melt since a radial escape of melted material in this region is avoided.

Incisions 8b are "cut" in an extension of the slots 8a at the circumference of the welding bush portion 2. The incisions are reduced in depth in longitudinal direction and run out in a cone-shaped manner towards the external circumference and enable radial deformation of the welding bush portion 2 during clamping by means of the screws 9. The clearance between the inserted tube and the heating coil 3 is thereby reduced or eliminated for a good welded connection.

The molded part 1 can have a wall thickness s in the region of the clamping portion 7 smaller than the wall thickness S in the region of the heating coil 3. The wall thickness S is preferably approximately twice as large as the wall thickness s. The clamping portion 7 is thereby easily clampable by the screws 9 and the weld portion has an adequate wall thickness S so that softening of the material occurs at the outer circumference during welding.

In addition to the arrangement of the two opposing slots, it is also possible to use only one slot with two flanges and one screw or also more than two slots with the appropriate flanges and screws circumferentially at the bushing end.

FIG. 4 is another embodiment a molded part 1a with only one welding bush portion 2 and a cylindrical tubular piece 20 for a bushing welded connection for direct connection with a T-piece or an elbow.

The molded part 1 can also be configured as a T-shaped piece with three welding bushing portions or as an elbow, arc or reducing sleeve with two welding bush portions.

No additional auxiliary means depending on the dimensioning of the molded part are required for fixing the tubes in the molded part since a simple clamping of the inserted tube is achieved by arranging commercially available screws in the region of the incisions or slots. Thus no auxiliary means need to be removed after the welding process.

While the preferred and alternate embodiments of the invention have been depicted in detail, modifications and adaptations thereof may be made without departing from the spirit and scope of the invention as delineated by the following claims.

We claim:

1. A molded part from thermoplastic material, comprising:
    at least one welding bush portion;
    an electrical heating coil on said welding bush portion for connecting the molded part with a tubularly-shaped part;
    a first incision in an insertion end of said welding bush portion;
    a clamping device for radial pre-clamping of the bush portion;
    at least one screw for clamping the parts together, wherein said screw is in the region of the incision in the molded-on flanges at an outer circumference of the bush portion;
    a clamping portion at an internal circumference of the welding bush portion, wherein said heating coil is a spiral winding adjoining said clamping portion; and
    wherein each incision is configured as a slot continuous up to the internal circumference and extends axially from the bush end until shortly before the beginning of the heating coil.

2. The molded part of claim 1, further comprising:
    a second incision radially opposite said first incision; and
    two flanges and one each screw arranged at each incision.

3. The molded part of claim 1, wherein said slot further comprises a deformable thin wall at the internal circumference.

4. The molded part of claim 1, further comprising an incision in the region of the heating coil at the outer circumference in extension of each slot.

5. The molded part of claim 1, wherein the wall thickness of the molded part in the region of the clamping portion is smaller than the wall thickness in the region of the heating coil.

6. The molded part of claim 1, further comprising two contacts next to each other at one bushing end circumferentially to the one or the plurality of incisions.

7. The molded part of claim 6, further comprising a conductive connector crossing the heating coil and spaced therefrom, wherein one of the two contact plugs is connected with a rear end of the heating coil by said conductive connector.

8. The molded part of claim 1, wherein the clamping portion is cylindrical.

9. The molded part of the claim 1, wherein the clamping portion is coneshaped.

* * * * *